UNITED STATES PATENT OFFICE.

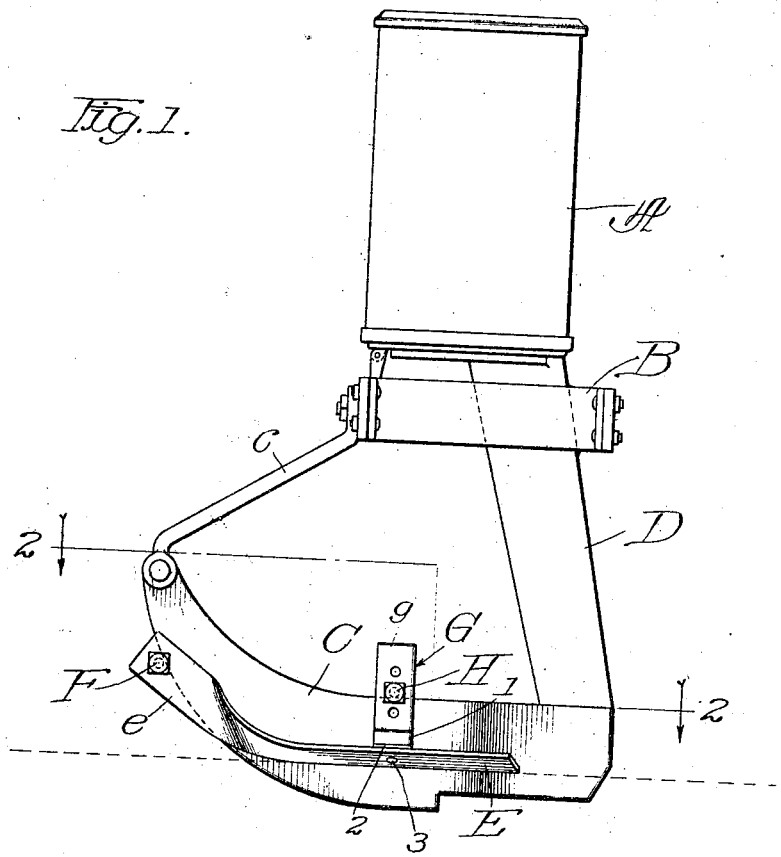
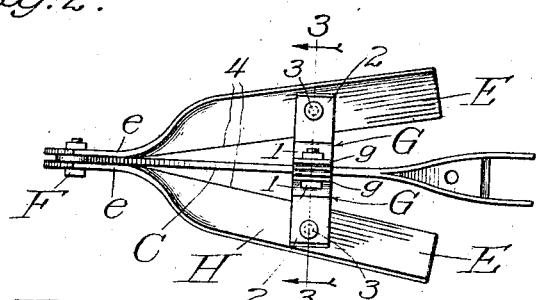
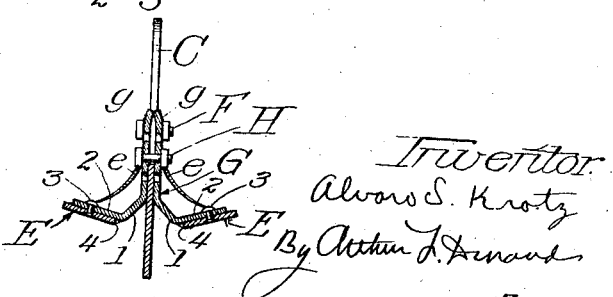

ALVARO S. KROTZ, OF JANESVILLE, WISCONSIN, ASSIGNOR TO THE JANESVILLE MACHINE COMPANY, OF JANESVILLE, WISCONSIN, A CORPORATION OF WISCONSIN.

DEPTH-GAGE RUNNER.

1,258,789.

Specification of Letters Patent. Patented Mar. 12, 1918.

Application filed June 26, 1916. Serial No. 105,831.

*To all whom it may concern:*

Be it known that I, ALVARO S. KROTZ, a citizen of the United States of America, and resident of Janesville, Rock county, Wisconsin, have invented a certain new and useful Improvement in Depth-Gage Runners, of which the following is a specification.

My invention relates to corn-planters of that kind in which a runner is connected with the dropping-mechanism of the seed-box above and is provided with an opening for depositing the kernels of corn in the trench as the planter moves along. Ordinarily, these machines are provided with two runners of this kind, one at each side, so that two rows of corn are planted as the machine travels forward. Usually, these runners are not provided with any means for limiting the depth to which they may enter the ground. It is important that the kernels of corn, or other seed, be planted at a uniform depth, and various expedients have been proposed for insuring this result. In some cases, wheels have been applied to keep the runners from going below a certain depth in the ground, and in other cases shoes have been attached to the runners to keep them from going below a certain depth. These have been subject, however, to various objections, one of the chief difficulties being that these devices would not scour if the soil was a little damp.

The object of my invention is, therefore, to provide a depth-gage for the runner of a planting-machine, of such character that it will slide smoothly and operate in the desired manner with all kinds of soil.

Another object is to provide a depth-gage of such form that stones or hard clods of earth will be pushed out of the way and to one side, as the machine travels forward, and of such character that if the clods are soft they will be pulverized to form a dust-mulch for the row of corn.

To these and other useful ends, my invention consists in matters hereinafter set forth and claimed.

In the accompanying drawings:—

Figure 1 is a side elevation of a corn-planter runner and seed-box, the said runner being provided with a depth-gage embodying the principles of my invention.

Fig. 2 is a horizontal section on line 2—2 in Fig. 1.

Fig. 3 is a vertical section on line 3—3 in Fig. 2.

As thus illustrated, the seed-box A may be of any suitable character, and is mounted on the planter-frame B in any suitable or known manner. The runner C is also of the usual form and construction, or of any suitable construction, and has its forward end connected with said frame by means of a brace c, its rear end being connected with the seed-mechanism by the usual spout or boot D, so that the kernels of corn or other seeds are deposited in the trench at the rear end of the runner. It will be understood that the corn-planter is provided with two runners of this character, with a seed-box for each runner, and that the dropping-mechanism is controlled by any of the well-known devices for this purpose, or by any suitable arrangement.

The depth-gage arrangement comprises a pair of shoes E which consist of metal bars having their front ends bent upward and toward each other, so that the forward end-portions e are in vertical planes and held flatwise together by a bolt or other fastening device F, or by any other suitable means. It will be understood that the forward portion of the runner C is clamped tightly by this bolt, so that the latter will hold the two shoes in place. The two brackets G are substantially L-shaped in form, consisting of metal bars bent to provide vertical portions g, inclined portions 1, and lower out-turned portions 2, the latter being tilted slightly upward at their outer ends. A bolt H extends through the portions g, and above the top of the runner C, to hold the two brackets in position. The portions 2 are secured by rivets 3, or by other suitable means, to the tops of the shoes E, so that the latter are held substantially horizontal. It will be observed that the shoes E converge together at their forward ends, when viewed from above, so that they flare apart at their rear ends. It will also be seen that these shoes E (see Fig. 3), are tilted upward at their outer edges, whereby their inner edges are somewhat lower than their outer edges. With this construction, the two shoes E not only slide on the ground to limit the depth of the runner in the ground, but also serve by their shape and arrangement to push stones and hard clods of earth outward and away from the sides of the runner, so that the wheel of the corn-planter will not crush the stones and clods into the row of corn. This wheel (not shown) is arranged, it will be understood, in the usual manner, behind the runner, so that it presses the corn into the ground and covers the seed with soft earth in the proper manner. If the clods of earth are soft, the shoes E will crush them and thus form a beneficial dust-mulch at each side of the row of corn. With the shoes shaped and arranged as shown, they will scour readily in all kinds of soil, even in damp soil, and the dirt will not tend to accumulate between the runner and the inner edges of the shoes. The forward end-portions of the two shoes, which are twisted and bent together in the manner shown, form a sort of wedge which will move forward and push the stones and clods to either side, thus leaving a clean path for the wheel behind. In this way, the corn or other seed is planted at a uniform depth, and in addition the depth-gage arrangement, consisting of the shoes E, will slide readily over the ground, are less liable to clog, and will crush the soft clods of earth and remove the stones and hard clods a distance away from the row of corn, thus insuring or tending to insure better results than were heretofore obtained with certain other devices for this purpose.

With the construction shown, the space between the inner edges 4 of the shoes E is V-shaped, when the structure is viewed from above, and in this way the spaces between the shoes and the sides of the runner are tapered forward, thus making it less possible for the dirt to become clogged between the shoes and the runner. Furthermore, with the straight horizontal portions of the two shoes converging forward, and with their outer edges 5 tilted upward, each shoe has its entire length so formed or shaped that it will ride over the dirt, thus crushing the soft lumps or clods of dirt, but pushing the hard clods and stones away from the trench in which the seed is dropped. This is insured, moreover, by the twisting of the front ends of the shoes into vertical planes, so that the extreme forward end of the depth-gage is practically a point or edge, like that of the apex of the wedge, and so that immediately behind this point or wedge is the forward end of the V-shaped space, the small end of this space beginning at a point substantially below the bolt F, whereby the forward cutting edge of the runner C is unobstructed and free to act in the required manner. The inclined portions 1 of the brackets G extend over the tapered or wedge-shaped spaces between the sides of the runner and the inner edges of the shoes, and as each of these portions is inclined upwardly from the inner edge of the runner, in the manner shown in Fig. 3, it follows that the dirt has free passage along the sides of the runner, immediately inside of the inner edges of the two shoes as the runner travels along and that for this reason there is less liability of clogging between the shoes and the sides of the runner. The front end of the runner C is simply clamped between the portions e of the shoes and the body of the runner is clamped tightly by the brackets G, so that the depth-gage is attachable to the ordinary runner. It can be readily detached when not desired. Also, it can be readily raised and lowered, as the brackets G have a plurality of holes for the bolts H, and the entire depth-gage can be adjusted forward and back and up and down to different positions on the runner.

What I claim as my invention is:—

1. The combination of a runner for planting seed, a pair of depth-gage shoes disposed at opposite sides of said runner and having upturned forward end-portions, means for separably connecting the shoes and for clamping said forward end-portions to the front edge of said runner, so that the shoes extend ahead of the runner, and devices for separably connecting and clamping the shoes to the upper edge of said runner.

2. The combination of a runner for planting seed, a pair of depth-gage shoes disposed at opposite sides of said runner, and means to removably and adjustably secure said shoes to said runner, said shoes converging forward a distance and then upward to a point in advance of the front cutting edge of the runner and having inclined flat bottoms tilted upward at the outer edges thereof.

3. The combination of claim 1, in which said devices include a pair of separable and adjustable clamping jaws to engage the sides of said runner, whereby said shoes are removable without disconnecting said devices therefrom, so that the shoes are adjustable up and down by sliding said means up and down on the forward edge of the runner and whereby said devices are slidable along the upper edge of the runner.

4. The combination of claim 2, in which each shoe consists of a straight flat bar having its front end-portion twisted into a vertical plane and bent upward, so that the inner edges of the bars are brought into position to cut forward in the ground close to the front edge of the runner.

Signed by me at Janesville, Wisconsin, this 5th day of June, 1916.

ALVARO S. KROTZ.

Witnesses:
M. E. CLARK,
E. TIMPANY.

Copies of this patent may be obtained for five cents each, by addressing the "Commissioner of Patents, Washington, D. C."